(12) United States Patent
Crawford

(10) Patent No.: US 10,988,232 B2
(45) Date of Patent: Apr. 27, 2021

(54) MODULAR AIRCRAFT

(71) Applicant: AERALIS LTD., Stowmarket (GB)

(72) Inventor: Tristan A. D. Crawford, Woodbridge (GB)

(73) Assignee: AERALIS LTD., Stowmarket (GB)

( * ) Notice: Subject to any disclaimer, the term of this patent is extended or adjusted under 35 U.S.C. 154(b) by 211 days.

(21) Appl. No.: 16/072,922

(22) PCT Filed: Feb. 3, 2017

(86) PCT No.: PCT/GB2017/050280
§ 371 (c)(1),
(2) Date: Jul. 26, 2018

(87) PCT Pub. No.: WO2017/134459
PCT Pub. Date: Aug. 10, 2017

(65) Prior Publication Data
US 2019/0039717 A1 Feb. 7, 2019

(30) Foreign Application Priority Data

Feb. 4, 2016 (GB) ........................ 1602059

(51) Int. Cl.
*B64C 1/16* (2006.01)
*B64D 29/06* (2006.01)
(Continued)

(52) U.S. Cl.
CPC ............ *B64C 1/16* (2013.01); *B64C 1/069* (2013.01); *B64C 1/26* (2013.01); *B64D 29/06* (2013.01);
(Continued)

(58) Field of Classification Search
CPC ....... B64C 1/16; B64C 2211/00; B64D 27/14; B64D 27/20; B64D 29/06
See application file for complete search history.

(56) References Cited

U.S. PATENT DOCUMENTS 2,504,421 A * 4/1950 Hawkins, Jr. .......... B64D 27/20
138/149
2,504,422 A * 4/1950 Hawkins, Jr. ............. B64C 1/00
244/74
(Continued)

FOREIGN PATENT DOCUMENTS

| EP | 1247734 | 10/2002 |
|---|---|---|
| FR | 2967971 | 6/2012 |
| WO | 00/56602 | 9/2000 |

OTHER PUBLICATIONS

International Preliminary Report on Patentability from a corresponding international patent application (PCT/GB2017/050280) dated Aug. 16, 2018, 10 pages.
(Continued)

*Primary Examiner* — Joseph W Sanderson
(74) *Attorney, Agent, or Firm* — Burr & Brown, PLLC

(57) ABSTRACT

A modular jet trainer aircraft which can be reconfigured to provide a plurality of different handling aircraft particularly beneficial in the training of pilots. A base structure on which elements can be changed to alter the handling capabilities, maneuverability and power of the aircraft. The aircraft may have a first basic configuration which enables a pilot to learn relatively basic handling skills. The propulsions system and/or wing structures can then be changed to provide an aircraft with more sophisticated handling and greater power capabilities. The engine is located fully outside the fuselage structure whilst still being positioned on the centre-line of the fuselage and with the engine's line of thrust directed through the centre of the fuselage and close to the aircraft's centre of gravity. By achieving this, the expensive design of the fuselage as primary or airworthy-critical structure can be completed independently from the installation of the engine.

26 Claims, 11 Drawing Sheets

(51) Int. Cl.
*B64C 1/26* (2006.01)
*B64D 33/00* (2006.01)
*B64C 1/06* (2006.01)
*B64D 33/02* (2006.01)

(52) U.S. Cl.
CPC .......... *B64D 33/00* (2013.01); *B64C 2211/00* (2013.01); *B64D 2033/0253* (2013.01); *B64D 2033/0273* (2013.01)

(56) References Cited

U.S. PATENT DOCUMENTS

| | | | | |
|---|---|---|---|---|
| 2,998,209 | A * | 8/1961 | Sharples | B64C 1/0009 244/15 |
| 3,194,515 | A * | 7/1965 | Cohan | B64D 27/20 244/54 |
| 3,640,492 | A | 2/1972 | Star | |
| 4,736,910 | A * | 4/1988 | O'Quinn | B64C 1/0009 244/118.2 |
| 4,821,980 | A * | 4/1989 | Clausen | B64D 27/14 244/54 |
| 5,897,078 | A | 4/1999 | Burnham et al. | |
| 5,975,464 | A * | 11/1999 | Rutan | B64C 39/02 244/118.2 |
| 6,405,977 | B1 | 6/2002 | Ash et al. | |
| 6,568,632 | B2 * | 5/2003 | Page | B64C 1/0009 244/120 |
| 6,708,924 | B2 * | 3/2004 | Page | B64C 1/0009 244/120 |
| 6,758,439 | B2 * | 7/2004 | Harrison | B64D 27/18 244/54 |
| 6,948,681 | B2 * | 9/2005 | Stupakis | B64C 39/02 244/117 R |
| 7,240,877 | B2 * | 7/2007 | Cazals | B64D 27/20 244/54 |
| 8,196,859 | B2 * | 6/2012 | Marche | B64C 39/10 244/54 |
| 8,220,739 | B2 * | 7/2012 | Cazals | B64D 27/20 244/58 |
| 8,251,310 | B2 * | 8/2012 | Marche | B64C 39/10 244/36 |
| 8,336,811 | B2 | 12/2012 | Cazals et al. | |
| 8,967,526 | B2 * | 3/2015 | Karem | B64C 1/00 244/36 |
| 9,221,532 | B2 * | 12/2015 | Karem | B64C 1/0009 |
| 9,505,484 | B1 * | 11/2016 | Al-Sabah | B64C 3/38 |
| 9,573,693 | B2 * | 2/2017 | Cazals | B64D 27/20 |
| 2002/0096598 | A1 | 7/2002 | Nelson | |
| 2002/0145075 | A1 | 10/2002 | Page et al. | |
| 2003/0192986 | A1 | 10/2003 | Page et al. | |
| 2004/0195454 | A1 | 10/2004 | Page et al. | |
| 2008/0099632 | A1 * | 5/2008 | Addis | B64D 27/14 244/53 B |
| 2010/0043450 | A1 * | 2/2010 | Marche | B64C 39/10 60/797 |
| 2010/0044502 | A1 * | 2/2010 | Cazals | B64D 41/00 244/54 |
| 2010/0108802 | A1 * | 5/2010 | Marche | B64F 5/50 244/54 |
| 2011/0127368 | A1 * | 6/2011 | Penda | B64D 27/26 244/54 |
| 2012/0018575 | A1 * | 1/2012 | Whiteford | B64D 27/20 244/54 |
| 2012/0292435 | A1 | 11/2012 | Karem | |
| 2014/0054413 | A1 * | 2/2014 | Cazals | B64D 27/14 244/54 |
| 2014/0061380 | A1 * | 3/2014 | Zhao | B64C 13/30 244/99.3 |
| 2015/0291285 | A1 * | 10/2015 | Gallet | B64D 27/20 415/60 |
| 2018/0086458 | A1 * | 3/2018 | Sartorius | B64C 39/024 |

OTHER PUBLICATIONS

International Search Report and Written Opinion of the International Searching Authority (PCT/GB2017/050280 filed Feb. 3, 2017) dated May 12, 2017, 17 pages.
GB Search Report (GB1602059.6) dated Jun. 24, 2016, 2 pages.
Dart Jet website, see especially variants, http://web.archive.org/web/20160111111654/http://dartjet.biz/ Pages archived. Originally posted Jan. 11, 2016.
AINonline Paris air show. Dart introduces modular trainer. http://www.ainonline.com/aviation-news/defense/20 15-06-18/ dart-jetintroduces-modular-trainer dated Jun. 18, 2015.
PPRuNe Professional Pilots rumour network http://www.pprune.org/military-aviation/563 017 -new-british-jet-trainerdesign-revealed.html dated Jun. 15, 2015, see discussion, pp. 1 and 2.
Royal Aeronautical Society, Paris Air Show-Day Zero, Modular dart trainer aims to hit bullseye http://aerosociety.com/News/Insight-Blog/3197/Paris-Air-Show-Day-Zero dated Jun. 15, 2015.

* cited by examiner

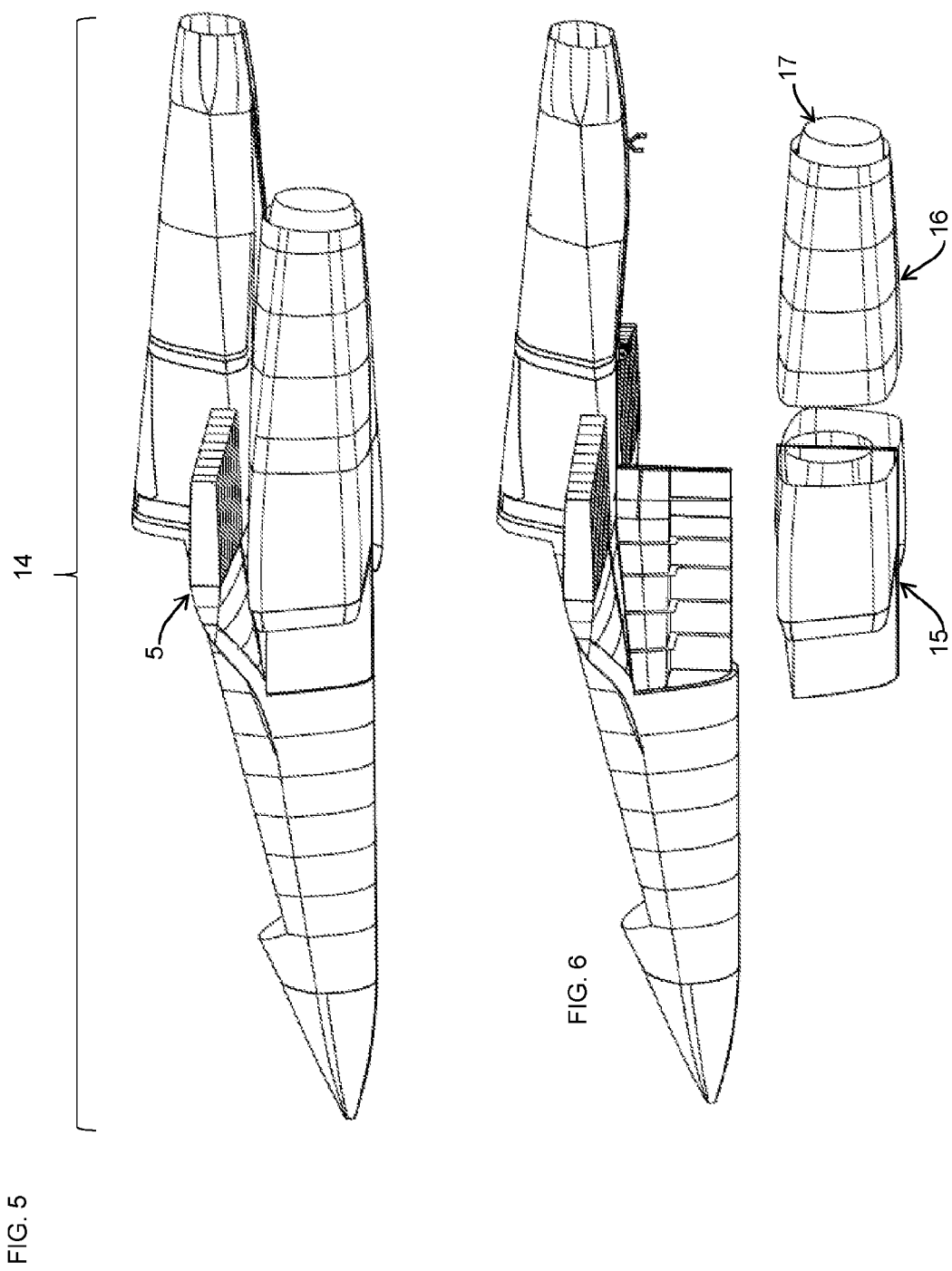

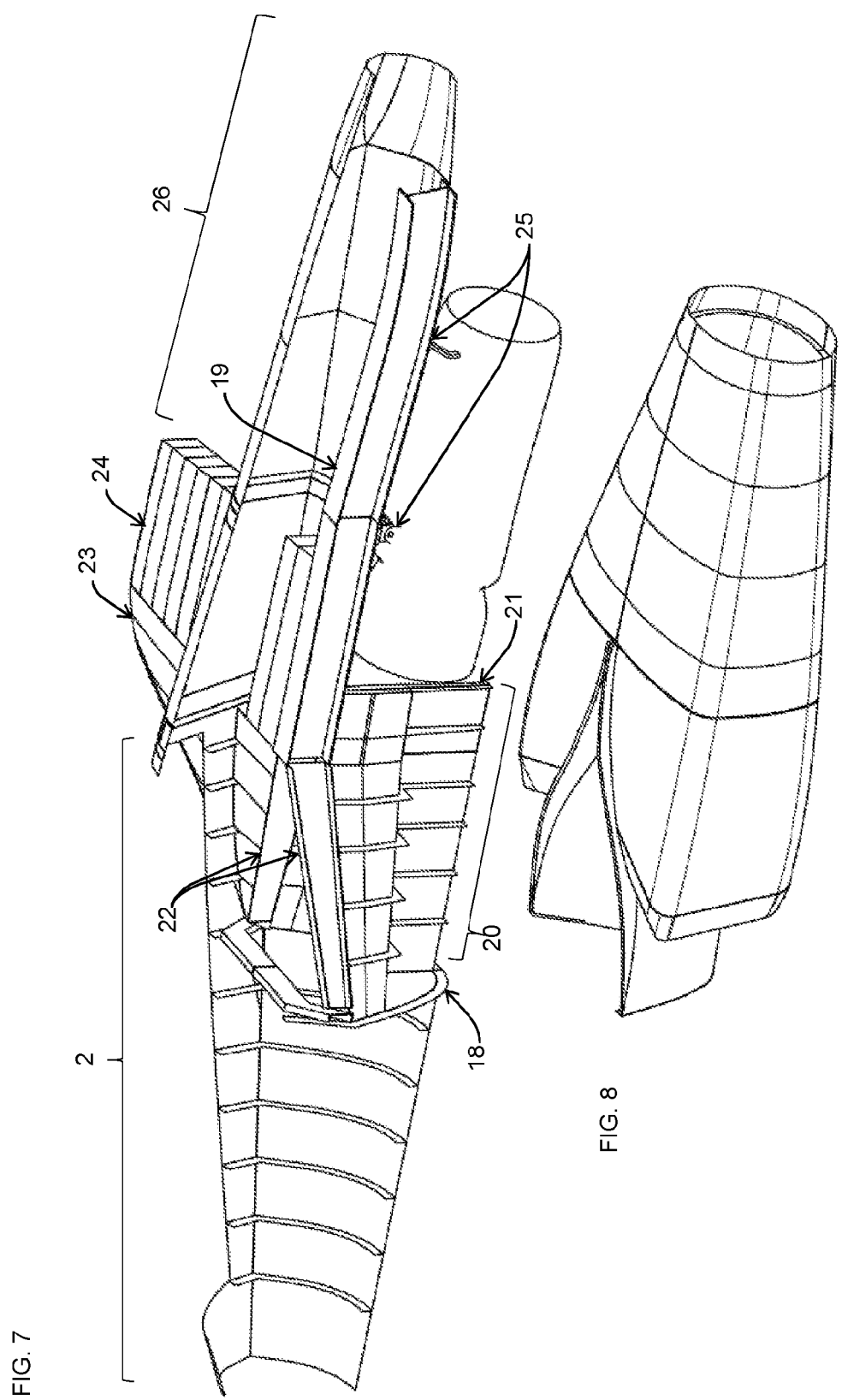

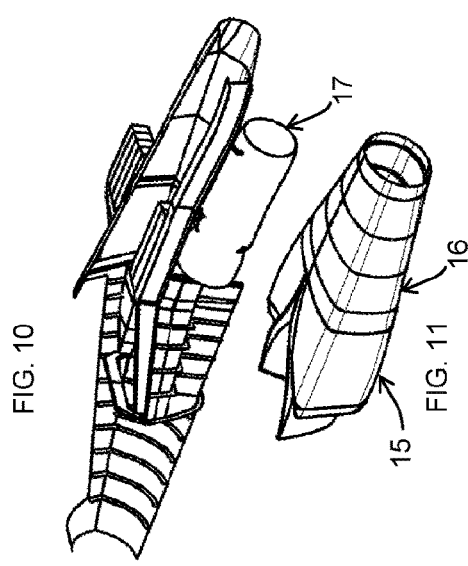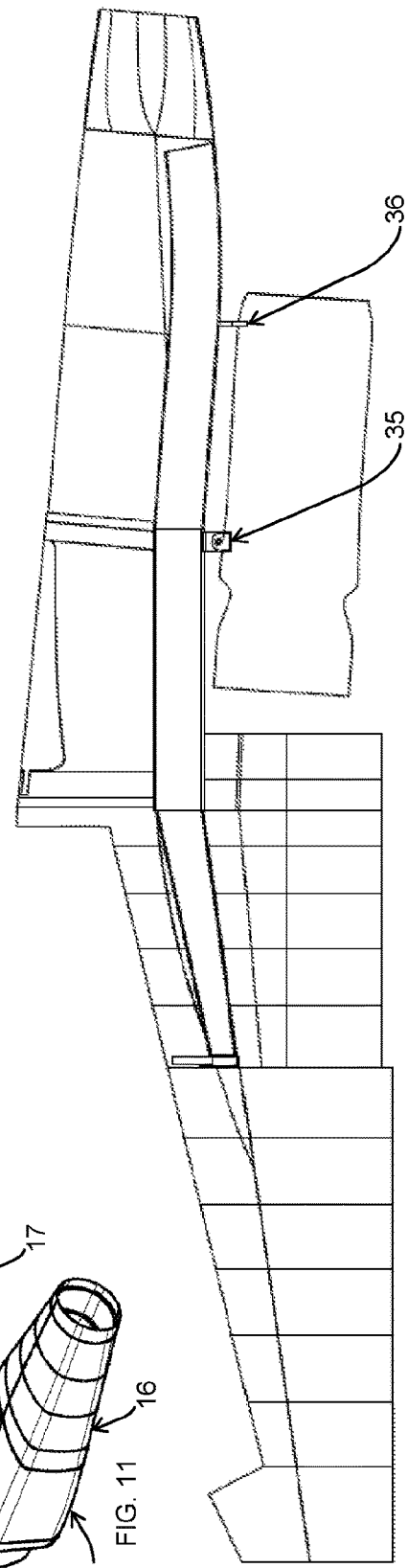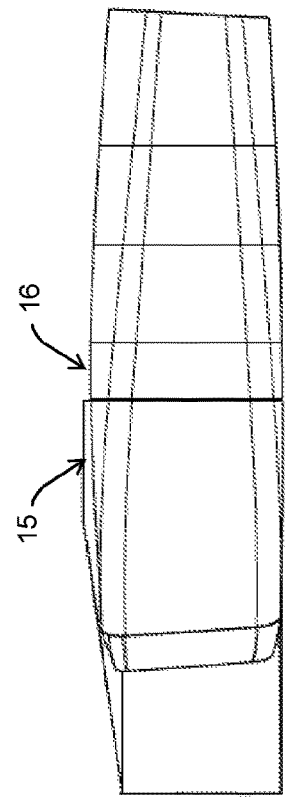

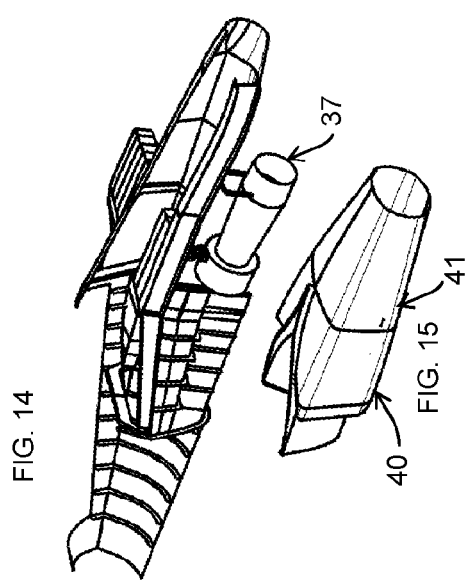
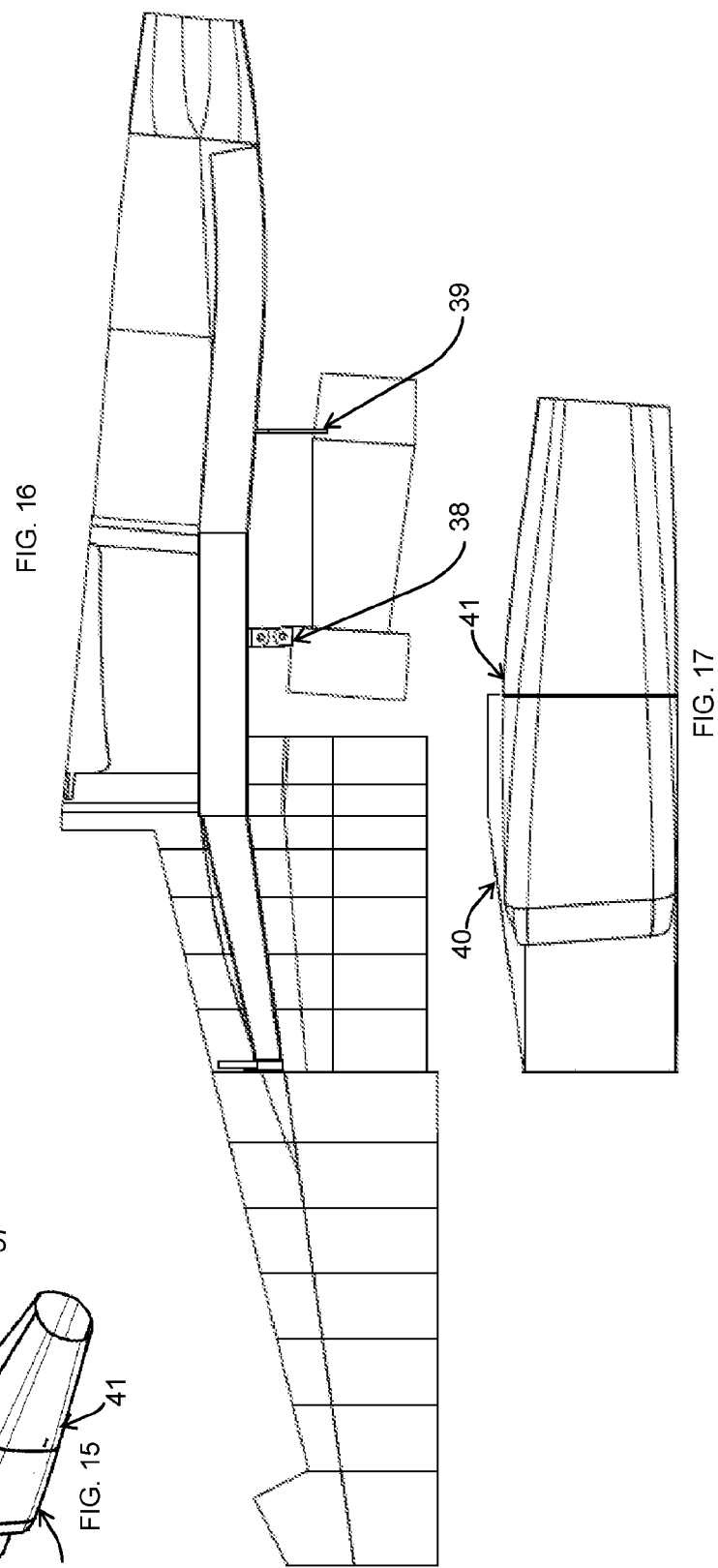

MODULAR AIRCRAFT

FIELD OF THE INVENTION

The present invention relates to an aircraft, an aircraft training assembly and a method of assembling an aircraft. In particular, the present invention relates to a modular jet trainer aircraft, a modular jet trainer aircraft assembly and a method of reconfiguring a jet trainer aircraft.

BACKGROUND TO THE INVENTION

The present invention relates to aircraft and airframe structures and methods for manufacturing them. More specifically, it relates to military jet aircraft airframes requiring the ability to accommodate different makes of jet engine without significant additional design and certification costs to alter the primary 'safety-critical' structural elements of the airframe to accommodate a new engine of different thrust or model within secondary or non-safety critical structure.

The requirements for modern military trainer aircraft are diverse, ranging from the need to train future pilots on a slow-speed aircraft initially, then progressing to faster and more manoeuvrable aircraft as the student gains experience. Typically this means that airforces must buy different aircraft for the different training phases, i.e. a slow, more docile trainer aircraft from one manufacturer at the early stage of training followed by a faster, more agile trainer aircraft from a different manufacturer for the later stages of training.

The slower trainer aircraft will typically have a relatively smaller diameter, low-thrust engine installed within the fuselage's structure, whilst the faster, more agile trainer will typically have a larger diameter, higher thrust engine installed within the fuselage's structure. Additionally, the faster, more agile trainer typically may also perform a light combat role, requiring the installation of a larger more powerful engine into the fuselage.

For training purposes operators must acquire both the slow and the fast type to train student pilots whilst paying prices which ensure the manufacturer recovers their individual development costs for each type of aircraft.

It is an aim of the present invention to overcome at least one problem associated with the prior art whether referred to herein or otherwise.

SUMMARY OF THE INVENTION

According to a first aspect of the present invention there is provided an aircraft comprising:
- a fuselage body having a centre-line, the fuselage body extending longitudinally from a nose end to a tail end and the fuselage body comprising a primary support structure for transferring forces along a longitudinal extent of the aircraft;
- a single propulsion system comprising at least one engine;
- mounting means to removably suspend the propulsion system externally from the fuselage body; and
- wherein the propulsion system comprises an aerodynamic housing which is suspendable from the fuselage in order to mount the propulsion system external of the fuselage body and along the centre-line of the fuselage body.

Preferably the aircraft comprises a central wing structure to removably secure lateral outer wing assemblies thereto.

Preferably the aerodynamic housing is suspendable below the fuselage body.

Preferably the fuselage body comprises a recessed portion into which the propulsion system is arranged to locate. Preferably the recessed portion locates on an underside of the fuselage body and behind a front part of the fuselage body.

Preferably the aerodynamic housing comprises a secondary or non-safety critical structure.

Preferably the aerodynamic housing defines an air inlet for the propulsion system.

Preferably the propulsion system comprises one and more preferably two lateral air inlet(s) wherein the or each lateral air inlet is defined by the aerodynamic housing. The or each air inlet may be provided by the secondary structure.

Preferably the aerodynamic housing comprises a front portion which is arranged to locate behind a front part of the fuselage body and wherein the (front part of the) fuselage body is arranged to shield the front portion (of the aerodynamic housing) and the front portion (of the aerodynamic housing) may therefore not be exposed to air impact when the aircraft is in flight.

Preferably the front portion comprises a periphery which is sealed against the fuselage body. The front portion may engage with and abut an external outer surface of the fuselage body. Preferably the front portion comprises a sealing perimeter. The sealing perimeter may comprise a continuous sealing perimeter (or may be an incomplete sealing perimeter).

The sealing perimeter may comprise a sealing member and the sealing member may comprise a resilient sealing strip or strips.

The sealing perimeter may be arranged, in use, to seal against an outer skin of the fuselage body. The sealing perimeter may be arranged, in use, to seal against an external surface of an outer skin of the fuselage body.

The primary support structure solely transfers the loads within the aircraft and the external mounting of the propulsion system prevents these loads being transferred around the propulsion system and/or being transferred through the aerodynamic housing.

Preferably the fuselage comprises an outer skin which encloses the support frame and these form the primary support structure (of the aircraft) and the propulsion system is located on the external side of the outer skin of the fuselage such that the propulsion system is not a part of (or even contained within) the primary structure. Preferably the propulsion system is (wholly/entirely) external of the primary support structure.

The aerodynamic housing may comprise a nacelle. The nacelle may comprise a first part and a second part. The nacelle may comprise a front section and an aft section (cowling).

Preferably the aerodynamic housing is arranged to be suspended aft or behind a front portion of the fuselage body. Preferably the aerodynamic housing is arranged to be suspended below a mid portion of the fuselage body and preferably below an upper mid portion of the fuselage body. Preferably the aerodynamic housing is arranged to be suspended from a location in front of a rear portion of the fuselage body.

Preferably a part of the aerodynamic housing seals against an outer surface of the fuselage body and creates a flush intersection between the respective outer surfaces.

Preferably a part of the aerodynamic housing seals against an outer surface of the fuselage body and creates a contiguous aerodynamic outer surface extending from the fuselage body to the aerodynamic housing. Preferably the contiguous aerodynamic outer surface comprises a shaped (contoured)

surface. Preferably the intersection between the fuselage body and the aerodynamic housing is contoured and/or shaped to create a smooth join between the fuselage body and the aerodynamic housing.

Preferably the aerodynamic housing (nacelle) defines an air inlet for the propulsion system and more preferably defines a first air inlet and a second air inlet for the propulsion system. The first air inlet may comprise a first (left) lateral air inlet and the second air inlet may comprise a second (right) lateral air inlet.

The first air inlet and the second air inlet may converge to create a bifurcated air inlet for the propulsion system.

The or each air inlet may comprise a tunnel or conduit section extending from an entry region outside/external to the aerodynamic housing to a delivery region located inside/internally in the aerodynamic housing. Preferably the aerodynamic housing defines the conduit section(s) and all walls defining the conduit section(s).

The propulsion system may comprise two engines. The first engine and the second engine preferably locate within the single aerodynamic housing of the propulsion system. The first engine and the second engine may be mounted in a parallel arrangement and may be suspended side by side below the fuselage body.

The propulsion system may comprise a plurality of engines located within the single aerodynamic housing.

Preferably the mounting means comprises a mounting device (or mounting arrangement).

The mounting means may comprise a first mounting assembly and a second mounting assembly.

Preferably only one mounting assembly is provided to solely support the propulsion system from the fuselage body whilst the second mounting assembly is provided to brace the propulsion system against (excessive) lateral movement.

Preferably the mounting means comprises a front mounting assembly and a rear mounting assembly.

The mounting means (the front and rear mounting assemblies) may be located along the centreline of the aircraft. Preferably the front mounting assembly is longitudinally spaced from the rear mounting assembly along the centreline of the aircraft.

The front mounting assembly may comprise a (front) mounting bracket assembly. The fuselage body may comprise a (front) mounting bracket and the aerodynamic housing may comprise a (front) mounting bracket and the front mounting assembly may comprise a (front) mounting element (pin member) to secure the two (front) mounting brackets directly together.

Preferably the front mounting assembly is arranged to solely transfer loads between the propulsion system and the fuselage body. Preferably the front mounting assembly transfers all of the weight of the propulsion system to the fuselage body. Preferably the front mounting assembly is the sole load transferring (supporting) connection between the propulsion system and the fuselage body.

The rear mounting assembly may comprise a (rear) mounting bracket assembly. The rear mounting assembly may comprise a stay or brace. Preferably the rear mounting assembly is unable to transfer the load (weight) or any significant part of the load (weight) of the propulsion system to the fuselage body.

Preferably the rear mounting assembly is arranged to maintain the alignment of the propulsion system (in particular the or each engine) with the centre line of the fuselage body.

The stay or brace may be connected to the fuselage body by a bracket arrangement. The stay or brace may be connected to the or each engine by a male member/female member arrangement wherein the male member is engaged within the female member to maintain the alignment of the propulsion system (engine(s)) whilst being unable to transfer a significant load from the propulsion system to the fuselage body.

The stay or brace may comprise two legs which extend from a single central part. The two legs may connect on opposite sides of an engine or may connect on separate engines.

The fuselage body may comprise a (rear) mounting bracket (stay/brace) and the aerodynamic housing may comprise a (rear) mounting bracket (stay/brace) and preferably comprises a pair of (rear) mounting brackets (stays/braces). The rear mounting assembly may comprise a spacer member or link member to connect/secure between the (rear) mounting bracket (stay/brace) of the fuselage body and the or each (rear) mounting bracket of the aerodynamic housing. The spacer element (spacer member) may have a longitudinal length to determine (or define) the spacing distance between the fuselage body and a rear portion of the propulsion system (engine(s)). A plurality of spacer elements (spacer members) may be provided to vary the spacing distance between the fuselage body and a rear portion of the aerodynamic housing.

The spacer element (spacer member) may have an upper mounting bracket for securing (with a pin) to the (rear) mounting bracket of the fuselage body. The spacer element (spacer member) may have one or two lower mounting brackets for securing (with respective pins) to one or two (rear) mounting brackets of a stay or brace which then connects to the propulsion system (engine(s)).

The mounting brackets of the propulsion system may be provided on an engine (or on both engines) located within the aerodynamic housing. The propulsion system is secured to the fuselage body directly by the or each engine. Preferably the aerodynamic housing is not directly secured to the fuselage body. Preferably the aerodynamic housing is indirectly secured to the fuselage body. Preferably the aerodynamic housing is secured around the engine(s). Preferably the aerodynamic housing is solely supported by (or from) the engine.

The propulsion system is suspended from a single point below the fuselage body and a rear portion of the propulsion system is maintained in alignment within the centre line of the fuselage body by a rear mounting assembly (or (rear) alignment maintenance assembly).

The mounting means may provide a single connection point for transferring the load between the propulsion system and the fuselage body and a single point longitudinally spaced from this load transfer point which acts to maintain the (lateral) alignment of the propulsion system relative to the fuselage body.

A plurality of propulsion systems may be provided in order to provide possible alternate propulsion systems for the aircraft. A first propulsion system may comprise a first engine and a second propulsion system may have a second engine having greater power than the first engine.

The aircraft training assembly may comprise a plurality of lateral outer wing assemblies and these may provide alternate wings for the aircraft.

Preferably the aircraft comprises a jet aircraft. Preferably the aircraft comprise a jet trainer aircraft.

According to a second aspect of the present invention there is provided an aircraft training assembly comprising and aircraft comprising:

a fuselage body having a centre-line, the fuselage body extending longitudinally from a nose end to a tail end and the fuselage body comprising a primary support structure for transferring forces along a longitudinal extent of the aircraft;

a first single propulsion system comprising at least one engine;

a second single propulsion system comprising at least one engine;

mounting means to removably suspend the first or second propulsion system externally from the fuselage body; and wherein the propulsion system comprises an aerodynamic housing which is suspendable from the fuselage in order to mount the propulsion system external of the fuselage body and along the centre-line of the fuselage body.

The aircraft training assembly may comprise a plurality of single propulsion systems.

The aircraft training assembly may comprise a plurality of mounting means to mount each propulsion system individually to the fuselage body.

Preferably the aircraft training assembly comprises a central wing structure to removably secure lateral outer wing assemblies thereto.

The aircraft training assembly may comprise a plurality of lateral outer wing assemblies and these may provide alternate wings for the aircraft.

According to a third aspect of the present invention there is provided a method of reconfiguring an aircraft, the aircraft comprising:

a fuselage body having a centre-line, the fuselage body extending longitudinally from a nose end to a tail end and the fuselage body comprising a primary support structure for transferring forces along a longitudinal extent of the aircraft;

a first single propulsion system comprising at least one engine;

mounting means to removably suspend the propulsion system externally from the fuselage body; and wherein the propulsion system comprises an aerodynamic housing which is suspendable from the fuselage in order to mount the propulsion system external of the fuselage body and along the centre-line of the fuselage body;

the method comprising removing the first single propulsion system from the fuselage body and suspending a second single propulsion system from the fuselage body.

Preferably the aircraft comprises a central wing structure to removably secure lateral outer wing assemblies thereto.

The method may comprise removing a first pair of lateral wing assemblies from the central wing structure and securing a second pair of lateral wing assemblies to the central wing structure.

BRIEF DESCRIPTION OF THE DRAWINGS

The present invention will now be described by way of example only, with reference to the drawings that follow, in which:

FIG. 5 is an isometric view of a fuselage body and propulsion system of a preferred embodiment of an aircraft in a second configuration.

FIG. 6 is an exploded isometric view of a fuselage body and propulsion system of a preferred embodiment of an aircraft in a second configuration.

FIG. 7 is an exploded isometric view of a cut away section of the fuselage body and propulsion system with the aerodynamic housing removed from around the engine of a preferred embodiment of an aircraft in a second configuration.

FIG. 8 is an isometric view of an aerodynamic housing of a propulsion system of a preferred embodiment of an aircraft.

FIG. 10 is an exploded isometric view of a cut away section of the fuselage body and propulsion system with the aerodynamic housing removed from around the engine of a preferred embodiment of an aircraft in a second configuration.

FIG. 11 is an isometric view of an aerodynamic housing of a propulsion system of a preferred embodiment of an aircraft.

FIG. 12 is a side view of a cut away section of the fuselage body and propulsion system with the aerodynamic housing removed from around the engine of a preferred embodiment of an aircraft in a second configuration.

FIG. 13 is a side view of an aerodynamic housing of a propulsion system of a preferred embodiment of an aircraft.

FIG. 14 is an exploded isometric view of a cut away section of the fuselage body and propulsion system with the aerodynamic housing removed from around the engine of a preferred embodiment of an aircraft in a second configuration.

FIG. 15 is an isometric view of an aerodynamic housing of a propulsion system of a preferred embodiment of an aircraft.

FIG. 16 is a side view of a cut away section of the fuselage body and propulsion system with the aerodynamic housing removed from around the engine of a preferred embodiment of an aircraft in a second configuration.

FIG. 17 is a side view of an aerodynamic housing of a propulsion system of a preferred embodiment of an aircraft.

DESCRIPTION OF THE PREFERRED EMBODIMENTS

Figure 1:
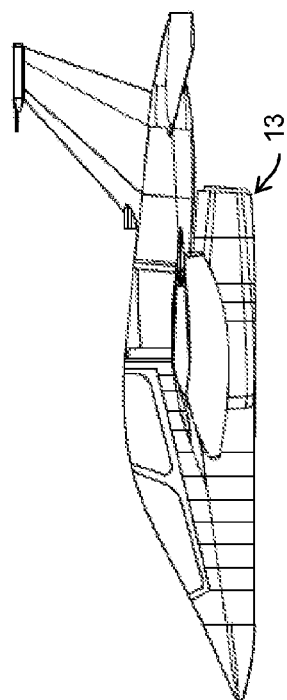
FIG. 1 is a side view of a preferred embodiment of an aircraft in a first configuration.

The present invention aims to provide a modular jet trainer aircraft which can be reconfigured to provide a plurality of different handling aircraft which will be particularly beneficial in the training of pilots. For example, the present invention provides a base structure on which elements can be changed in order to alter the handling capabilities, manoeuvrability and power of the aircraft. The aircraft may have a first basic configuration which enables a pilot to learn relatively basic handling skills. The propulsions system and/or wing structures can then be changed to provide an aircraft with more sophisticated handling and greater power capabilities. This adaptation may maintain the cockpit and instrumentation layout to reduce unnecessary distractions to the pilot and to enable the trainer and pilot to concentrate on the changes in the handling/capabilities of the aircraft rather than merely on the physical layout. However, the instrumentation and layout may also be progressively changed in a controlled manner as the aircraft is reconfigured to become more sophisticated.

The aircraft may be further reconfigured to provide an expert configuration with high levels of manoeuvrability, handling and power/speed. It will be appreciated that the ability to easily reconfigure the aircraft of the present invention allows for numerous levels of aircraft to be set up and/or for discrete and specific changes to be made and to enable selected parameters to be altered in a very controlled manner. This helps to provide very specific and dedicated training of pilots which can be targeted to individual goals.

In addition, the aircraft can be configured to emulate or simulate the handling, manoeuvrability and power of a specific aircraft to help a pilot learn towards the flying of specific aircraft. Moreover, an operator having a fleet of two or more different configurations of aircraft will, as a result of the high commonality of parts and internal systems of the different configurations, benefit from significantly reduced maintenance, spares and support training and qualification costs across the fleet compared to current fleets where fully different aircraft types each bring their own maintenance, spares and support training requirements.

As mentioned above, for training aircraft there is usually a major step change when progressing between different training aircraft and also there is a requirement for numerous complete different aircraft to be available. There is not currently a configurable aircraft and specifically an aircraft whose fuselage primary structure or modular propulsion unit embodied as part of the fuselage could accept a range of potentially different engine sizes without the need to re-design and re-certify the primary structural design of the fuselage or of the propulsion unit module contained therein.

The present invention involves enabling military jet aircraft which require propulsion units to be embodied on the centreline of the aircraft, to have an engine located outside the aircraft's fuselage structure, so as to reduce the cost of primary structural re-design of the fuselage or modular propulsion unit if the aircraft must be modified to accommodate a different engine type or model.

The invention involves the engine being located fully outside the fuselage structure whilst still being positioned on the centre-line of the fuselage and with the engine's line of thrust directed through the centre of the fuselage and close to the aircraft's centre of gravity. By achieving this, the expensive design of the fuselage as primary or airworthy-critical structure can be completed independently from the installation of the engine.

The resulting structure needed to surround the engine ('the nacelle') to provide aerodynamic streamlining and to provide its air intake system, having been moved outside the fuselage or standard propulsion unit, becomes secondary or non-airworthy-critical structure, and so can be designed for less cost, and more quickly and cheaply for different engine types and sizes, whilst the structural connection between the engine itself and the fuselage remains of a standard design such as a lug and bolt arrangement sized for the heaviest engine planned for service use.

In a preferred embodiment, the nacelle is made of two sections, firstly a forward section that acts as an air intake, this being a bifurcated duct that directs air towards the front face of the installed engine, and secondly an aft section that houses the engine and provides an aerodynamic surface around it to reduce drag. Being part of the nacelle rather than the fuselage, the air intake section can be re-designed without impacting the design of the primary safety-critical fuselage structure and so result in a new configuration of the aircraft being developed faster and at lower cost whilst also delivering air more optimally to different types of engine housed within the nacelle.

Using the present invention, in particular jet trainer aircraft requiring an engine(s) on the aircraft centreline with a wide range of thrust requirements to cover the wide range of flying training can be designed to have a common fuselage to which can be externally attached different engine types and sizes without incurring significant additional design and certification costs to change the fuselage structure or an engine-supporting propulsion unit contained therein, whilst also meeting the performance needs of both the basic training role and the advanced training role, and even allowing for larger engine types were the trainer to be modified for light combat roles.

The preferred embodiment of the present invention will now be described in more detail.

Figure 2:
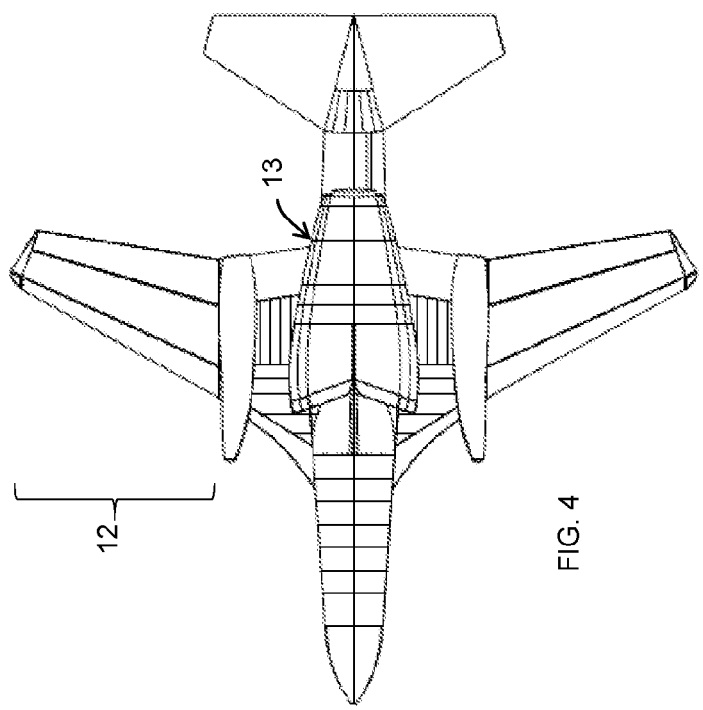
FIG. 2 is an underneath view of a preferred embodiment of an aircraft in a first configuration.

As shown in FIG. 1 and FIG. 2, the aircraft 1 comprises a fuselage body having a centre-line which bisects the fuselage body (and the aircraft). The centre line thereby divides the fuselage body into two equal symmetrical halves. The fuselage body extends longitudinally from a nose end to a tail end. The fuselage body comprises a primary support structure for transferring forces throughout the aircraft including along a longitudinal extent of the aircraft. Within aircraft, primary and secondary support structures are two distinct structures with different definitions and requirements. In particular, airworthiness standards define primary structures as those that would endanger the aircraft upon failure whereas secondary structures are those that do not cause immediate danger upon failure. Accordingly, the distinction between primary and secondary structures is clear.

The present invention provides a removable propulsion system which is suspended outside of the primary support structure and the replacement of the propulsion system does not interfere with the primary support structure. Accordingly, the primary support structure does not need to be re-certified as each different propulsion system is suspended to the aircraft. This makes the reconfiguring of the aircraft simpler and cheaper due to the absence of having to interfere with the primary support structure as the propulsion system is changed. The propulsion system includes an aerodynamic housing which is of a secondary support structure.

The aircraft 1 includes a single propulsion system comprising at least one engine. In some configurations there may be two or more engines mounted within the single propulsion system. This may enable the power of the aircraft to be increased beyond that of a single engine aircraft without altering the primary structure or other elements.

The aircraft also comprises a central wing structure to removably secure lateral outer wing assemblies thereto. These lateral wing assemblies may again be easily secured to the main fuselage body to alter the characteristics of the aircraft. The aircraft may be reconfigured by replacing just the lateral wing assemblies or the propulsion system or both the lateral wing assemblies and the propulsion system. As it will be appreciated, the main fuselage body and, in particular, the primary support structure is not reconfigured and this greatly simplifies the reconfiguration of the aircraft and makes it more affordable for a training company to be able to offer pilot training services in a number of aircraft with different flight characteristics.

The fuselage body includes mounting means to removably suspend the propulsion system externally from the fuselage body. In particular, the propulsion system is suspended from and hangs below the fuselage body and is specifically suspended underneath a lower external surface provided on the fuselage body (specifically a mid section of the fuselage body). The propulsion system is also arranged to locate behind a front section of the fuselage body. As will be explained later, the mounting means provides a single discrete load bearing connector assembly to simply secure the propulsion system to the primary structure/fuselage body at a single point through a single assembly. The propulsion system also includes an alignment assembly to maintain the (lateral) alignment of the propulsion system (the or each engine) within the centre line of the fuselage body.

The propulsion system includes an aerodynamic body or aerodynamic housing since it is located externally from the fuselage body and primary structure which in itself is aerodynamic. The aerodynamic housing of the propulsion system comprises the nacelle of a secondary structure. The nacelle provides sealing surfaces in order for the nacelle to be flush with the external surface of the fuselage body in places. In particular, the nacelle has front edges which abut and seal against the fuselage body to provide a flush surface which then extends to provide air intake surfaces for the propulsion system. The nacelle and the fuselage body are arranged to provide a contiguous aerodynamic surface. This may provide a part of an entry region(s) to air inlet(s) for the propulsion system.

As mentioned above, the propulsion system comprises an aerodynamic housing which is suspendable from the fuselage in order to mount the propulsion system external of the fuselage body and along the centre-line of the fuselage body. Accordingly, the propulsion system directly provides the thrust along the centre line to emulate the characteristics of jet aircraft having single central engines. The present invention is thereby able to emulate aircraft or simulate the flying characteristics of aircraft which would usually have the engine mounted within the primary structure. The present invention achieves this by having a removable propulsion system which can be suspended below and external to the primary structure (and fuselage body) and provides a sealing surface or perimeter which thereby creates a flush interface between the primary structure (fuselage body) and the replaceable nacelle (secondary structure) of the propulsion system. The seal effectively extends around a front portion of the aerodynamic housing such that this front portion is not impacted by the air, in use (i.e. whilst flying forwards). The air inlets are located outside of this enclosed and shielded front portion to enable the air inlets to intake and deliver the required air for the engine(s) and to function correctly.

The fuselage body of the present invention provides a recessed portion into which the propulsion system is mounted (or even 'plugged in'). This recessed portion locates on an underside of the fuselage body and behind a front portion of the fuselage body. The propulsion system or at least the aerodynamic housing effectively fills this recess to appear or simulate a conventional jet trainer aircraft where the engine is contained in the primary structure.

As shown in FIG. 1 and FIG. 2, the aircraft may be in a first configuration to provide a basic jet trainer aircraft 1 is shown in side view and underside view with a forward fuselage 2 consisting of a cockpit 3 with seating for up to two crew members, a centre fuselage 4, a centre wing structure 5, sponsons for stowing the main landing gear 6, a straight wing outer wing structure 7, an aft fuselage 8 with vertical and horizontal tail surfaces 9 and a nacelle 10 containing the aircraft's jet engine.

Figure 3:
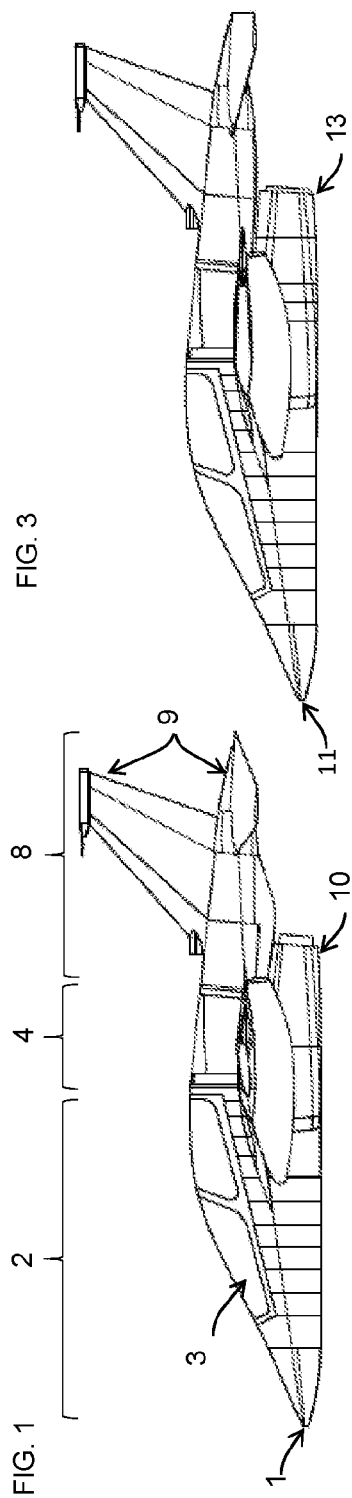
FIG. 3 is a side view of a preferred embodiment of an aircraft in a second configuration.
Figure 4:
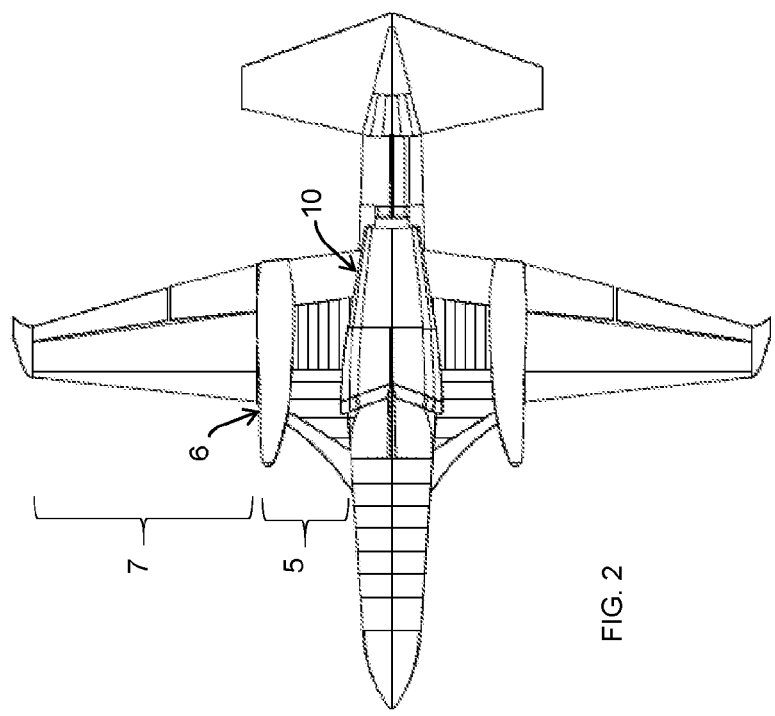
FIG. 4 is an underneath view of a preferred embodiment of an aircraft in a second configuration.

As shown in FIG. 3 and FIG. 4, the aircraft may be in a second configuration to provide an advanced' jet trainer aircraft 11 with the same elements as the basic jet trainer 1 with the exception of a swept wing outer wing structure 12 and an engine nacelle 13 of larger proportions than the first nacelle 10 for the purposes of housing a larger engine than the basic jet trainer 1.

The basic jet trainer configuration 1 using the straight outer wing 7 and smaller engine contained in the smaller nacelle 10 provides simple performance for basic military pilot training whereas the second configuration 11 using the swept outer wing 12 and larger engine contained in a large nacelle 13 provides high performance for advanced military pilot training.

The two configurations retain a common fuselage body comprising forward fuselage section 2, a centre fuselage section 4 and an aft fuselage section 8 and centre wing structure 5 with common landing gear sponsons 6 in order that only the outer wing 7, 12 and nacelle 10, 13 with its appropriate engine need only change to create either the basic or advanced jet trainer configurations.

Referring to FIG. 5 and FIG. 6, the common fuselage 14 and centre wing structure 5 is shown together with an example of the installed engine nacelle, in this case the large engine nacelle 13 for advanced flying training. As shown in FIG. 6, the engine nacelle 13 is an independent structure distinct and separate from the common fuselage and central wing structure.

The engine nacelle 13 is made up of a forward section consisting of the air intake 15 and a rear section consisting of an engine cowling 16 and the engine contained therein 17. The common fuselage 14 and central wing structure 5 remain fixed and unchanged for both aircraft configurations 1, 11 and accommodates all structural loads of the aircraft without requiring the structure of the separate engine nacelle 10, 13.

Figure 29:
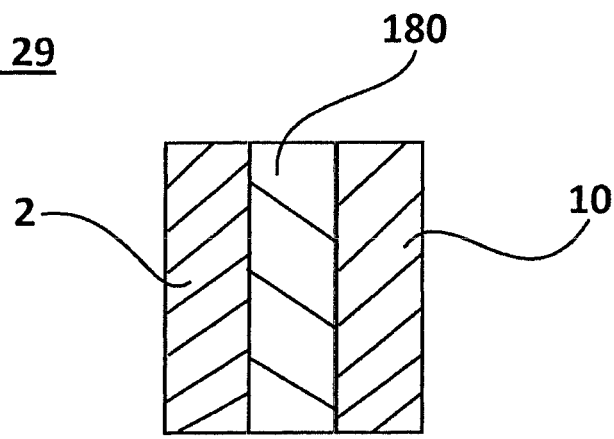
FIG. 29 is a schematic sectional view depicting a resilient sealing strip between a front part of a fuselage body and a periphery of a front portion of an aerodynamic housing.

FIG. 29 is a schematic sectional view that depicts a resilient sealing strip 180 between a front part of a fuselage body 2 and a periphery of a front portion of an aerodynamic housing 10.

The common fuselage and central wing structure is therefore designed as primary (safety-critical) structure. The engine nacelle consisting of forward and aft sections may vary in size and shape to be either the large engine unit 13 or the smaller engine unit 10 and is not designed or certified to carry any critical structural loads of the aircraft and is therefore designed as secondary (non-safety-critical) structure.

Referring FIG. 7 and FIG. 8, the starboard half of the internal structure of the common fuselage 14 and centre wing structure 5 is shown for the purposes of explaining how all the structural loads of the aircraft are carried separately from the structure of the engine nacelle 10, 13. The forward fuselage 2 is made up of a series of conventional skin, frames and stringers fabricated from either aluminium alloy or carbon-fibre-reinforced-plastic (CFRP), or a combination of both. Within the forward fuselage 2 there is a strong frame 18 made of alloy or CFRP which transfers primary safety-critical structural loads from the forward fuselage 2 into a central main keel beam 19 via a tapering structural box 20 made up of skins and frames converging to a full-depth web 21 that connects to the underside of the main keel beam 19, and also via two lateral spars 22 that converge to connect to the forward end of the main keel beam 19.

The two lateral spars also form part of the forward centre wing 23 to allow a proportion of the loads from the forward fuselage to be transferred via the forward centre wing box 23 to the centre wing structure 24. The tapering structural box 20, two lateral spars 22 and main keel beam 19 can be made of either aluminium alloy or CFRP or other suitable material. The main keel beam 19 continues aft along the centreline of the aft fuselage 8, providing a cantilever beam under which is attached the large engine 17 via discrete attachments 25 made of titanium, aluminium or similar alloy.

The discrete attachments are the only primary safety-critical components connecting the engine 17 to the common fuselage 14. The main keel beam 19 is stabilised by the conventional structure of the aft fuselage 26 this consisting of conventional frames, skins and stringers made from either aluminium alloy or CFRP, or a combination of both.

Figure 9:
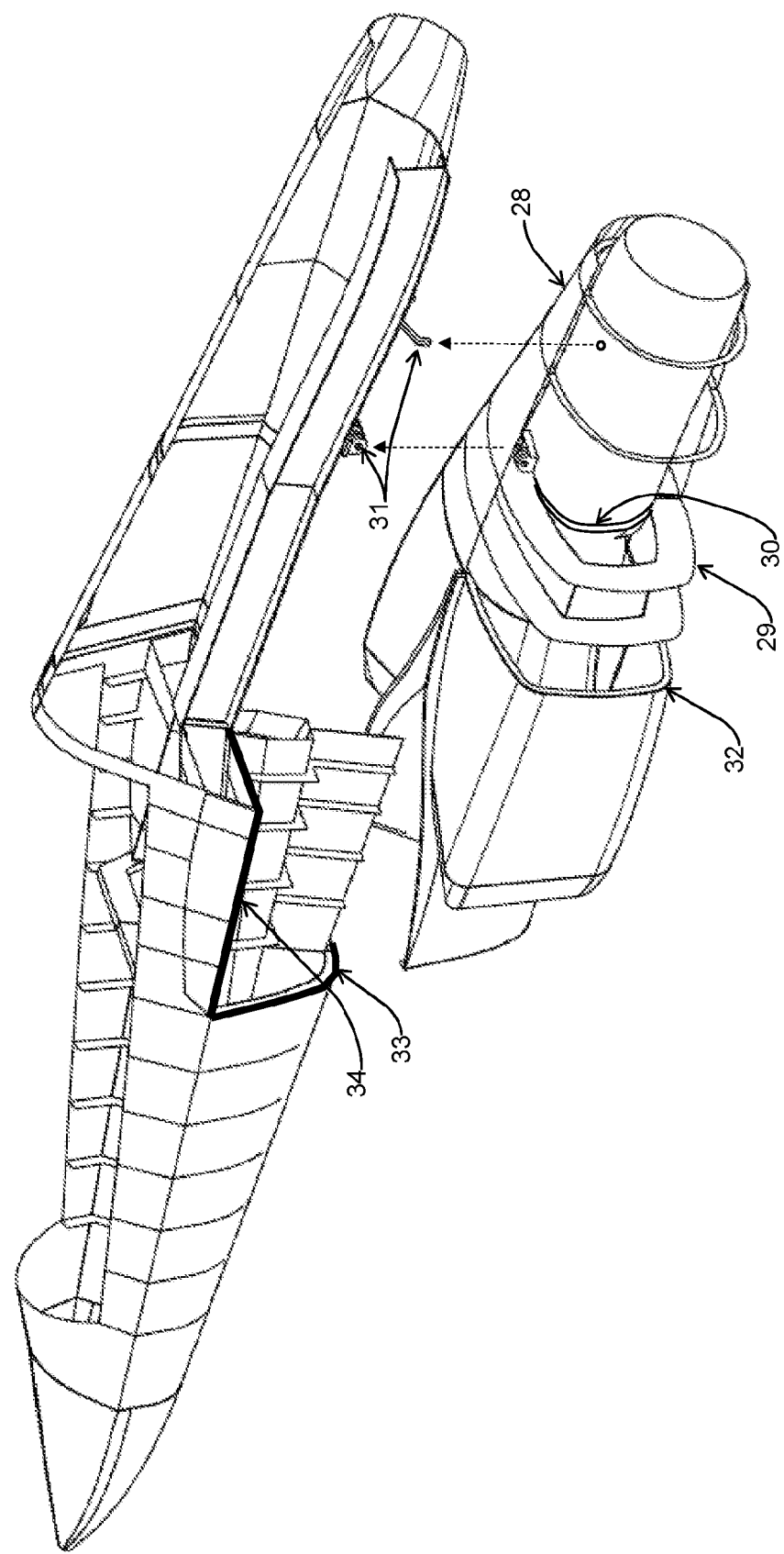
FIG. 9 is an exploded isometric view of a cut away section of the fuselage body and the propulsion system of a preferred embodiment of an aircraft in the second configuration.

Referring to FIG. 9, the combination of the forward 15 and aft 16 sections of the engine nacelle 10, 13 are shown separately from the common fuselage 14; the port skin of the aft section 16 is removed for illustration purposes. The aft section 16 provides the housing for the engine and is made of a combination of skins, frames and sub-structure 27 made from either aluminium alloy or a range of reinforced polymers or a combination of both which, when installed on the aircraft provides the rear external surface 28 of the engine nacelle.

The aft section 16 is only structurally attached to the aircraft via the cowling's internal sub-structure 29 connecting to the engine's external structure 30, the engine 17 then being itself attached to the fuselage via the discrete attachment points 31. The forward section 15 is made of a combination of skins, frames and sub-structure made from either aluminium alloy or a range of reinforced polymers or a combination of both which when installed on the aircraft provides the air intake to the engine. The forward section 15 is attached to the aft section 16 via a frame 32. This is the only structural attachment between the forward section 15 and the rest of the aircraft.

The forward section 15 when installed fits around the tapering structural box 20 to provide its external surface yet does not connect structurally to it. Conversely the structural function of the tapering structural body 20 is not dependent on the forward section 15 when fitted around the tapering structural box 20. Conventional expandable seals fill the resulting gaps between the forward section 15 and the forward 33 and upper 34 limits of the tapering structural box 20. Consequently the nacelle 10, 13 only connects structurally to the engine 17 which then connects conventionally to the common fuselage 14.

Referring to FIG. 10, a side view of the common fuselage 14, main keel beam 19 and large engine 17 is shown. FIG. 11 is a small perspective view to assist with situating FIG. 10 (the main drawing). Conventional attachment lugs 35 on both the engine and the underside of the main keel beam 19 interlock and are held together via a pin to form the attachment for the engine to the main keel beam 19. This attachment is designed to carry the entire weight of the engine and is the only attachment required to attach the engine to the fuselage. A short bracing strut assembly 36 at the rear of the main keel beam 19 connects to and stabilises or braces any lateral movement of the rear of the engine. The short bracing strut assembly is only required to restrict lateral movement of the engine and is not required to carry any weight of the engine.

As mentioned above, the mounting of the propulsion system prevents any loads intended for the primary structure being inadvertently diverted through the propulsion system (secondary structure). This is achieved by providing a single front mounting assembly which is designed to transfer all of the loads and weight of the engine and to solely suspend the propulsion system underneath the fuselage body. A rear mounting assembly is provided purely to maintain the (lateral) alignment of the propulsion system (and engine) with the centre line of the fuselage body.

The front mounting assembly provides the single load bearing suspension point for the propulsion system. This comprises complimentary engaging brackets. The rear mounting assembly comprises a stay or brace which maintains the alignment but does not have the capability of transferring the loads/weight from the propulsion system to the fuselage body. The brace/stay may comprise two leg sections which extend laterally to both outer sides of the engine. The brace/stay then provides two female (cup) type fittings into which two male members (lugs) provided on the engine can be contained. These fittings may provide movement therebetween whilst maintaining the overall alignment of the propulsion system/engine.

The combined forward 15 and aft 16 sections of the engine nacelle are shown in FIG. 12 and FIG. 13 and are shaped to suit the large engine 17. These sections are connected to the aircraft as described above. The structure of the common fuselage 14 and centre wing structure 5 remain unchanged.

Referring to FIG. 14 and FIG. 15, a side view of the common fuselage 14, main keel beam 19 and small engine 37 is shown. The small engine 37 is distinctly different from the large engine 17. Conventional attachment lugs 38 on both the engine and the underside of the main keel beam 19 interlock and are held together via a pin to form the attachment for the engine to the main keel beam 19. This attachment is designed to carry the entire weight of the engine and is the only attachment required to attach the engine to the fuselage. A long bracing strut assembly 39 at the rear of the main keel beam 19 connects to and stabilises or braces any lateral movement of the rear of the small engine 37. The long bracing strut assembly is only required to restrict lateral movement of the engine and is not required to carry any weight of the engine. The combined forward 40 and aft 41 sections of the small engine nacelle 10 are slightly different in shape and size from the forward 15 and aft 16 sections for the large engine nacelle 13, and are shown in FIG. 16 and FIG. 17 as being designed to suit the small engine 37. The common fuselage 14 and central wing structure 5 remain unchanged.

Figure 18:
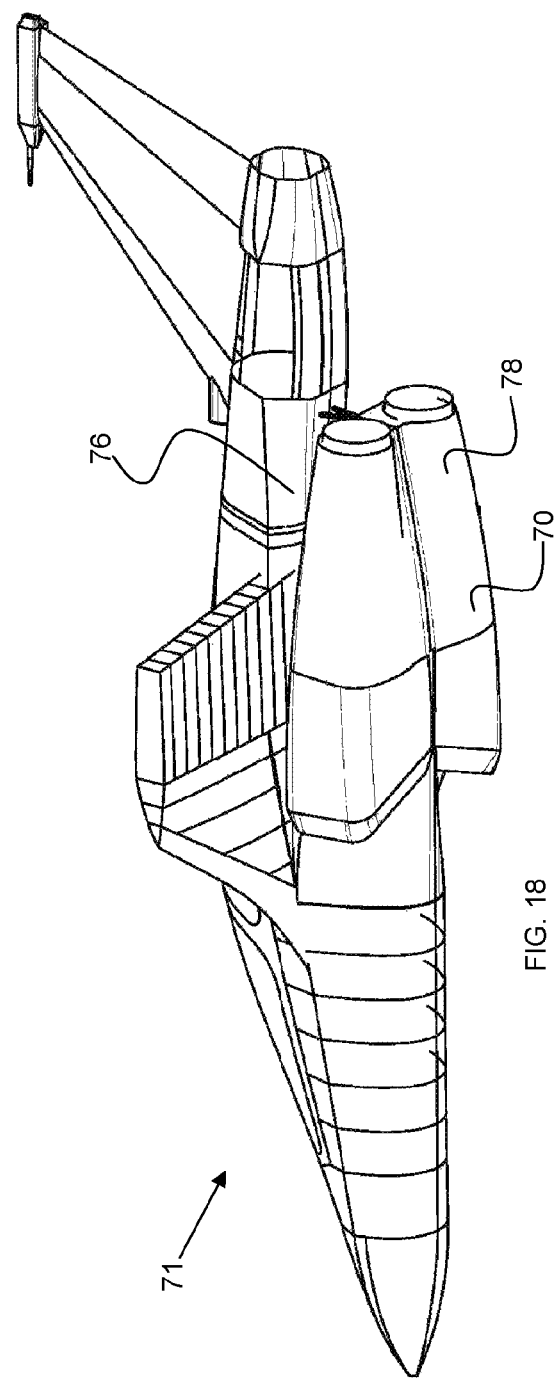
FIG. 18 is a side isometric view of another embodiment of an aircraft with a twin engine within the propulsion system.
Figures 19, 20:
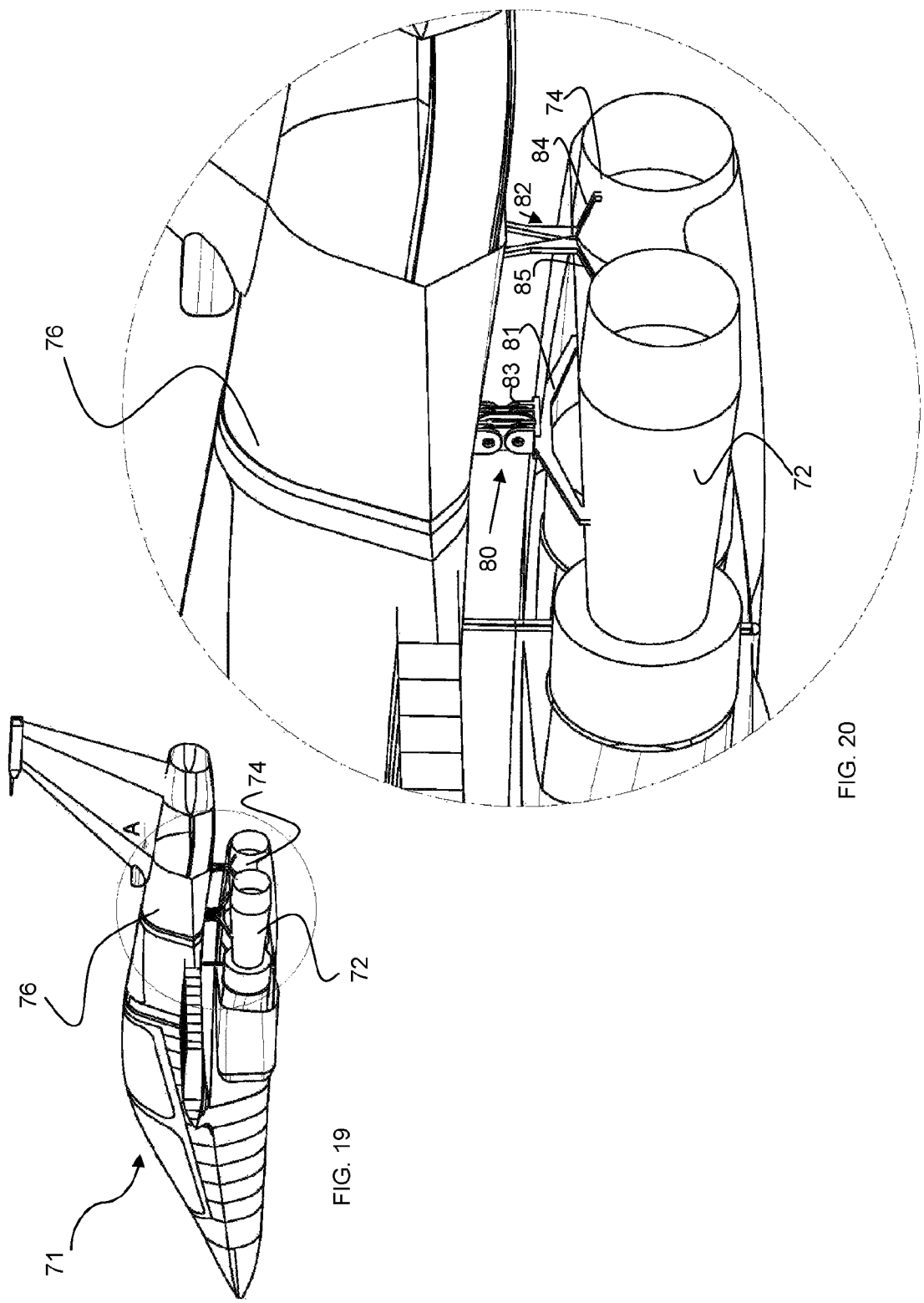
FIG. 19 is a side isometric view of another embodiment of an aircraft with a twin engine within the propulsion system and the aft section of the aerodynamic housing cut-away for clarity.
FIG. 20 is a detailed representation of A in FIG. 19 providing a side isometric of another embodiment of an aircraft with a twin engine within the propulsion system and the aft section of the aerodynamic housing cut-away for clarity.

As shown in FIG. 18, FIG. 19 and FIG. 20 the aircraft 71 has a propulsion system 70 that include more than one engine 72, 74 and in this example the propulsion system 70 comprises two engines 72, 74 or twin engines 72, 74. These engines 72, 74 are mounted in parallel underneath the fuselage body 76. Both engines 72, 74 are mounted within a single aerodynamic housing 78 or nacelle. As above, the aircraft 71 is still essentially the same apart from two engines 72, 74 being mounted within the centre line mounted single propulsion system 70.

As described previously, each engine 72, 74 is mounted from a front position and a rear position. The front position provides the single sole load bearing attachment 80. The rear position provides a stay or brace 82 to maintain the orientation and alignment of each engine 72, 74. The stay or brace 82 does not support the load of the respective engine(s) 72, 74 but maintains the directional stability of each engine 72, 74.

As shown in FIG. 19 and FIG. 20, the front attachment bracket comprises a laterally extending member or strut 81 which diverges from a single support bracket 83. The strut 81 provides two attachment brackets at each end to enable the loads of the engines 72, 74 to be supported from a single point provided by the primary structure of the aircraft 71. This single point load transfer thereby prevents any functional flying loads being transferred from the fuselage body 76 to or through the propulsion system 70. The rear mounting points only provide directional stability for the engines and do not enable these significant operational forces to be transferred.

The rear mounting means provides a stay/brace or two stays/braces 84, 85 which are coupled to the engines 72, 74. This coupling may be in the form of a male member and female member which are engaged to maintain the alignment of the engines but without the capability of supporting the weight/load of the engine 72, 74. In any event, the centre of gravity of the engines 72, 74 is arranged such that the load is directed through the front mounting bracket 80.

Figure 30:
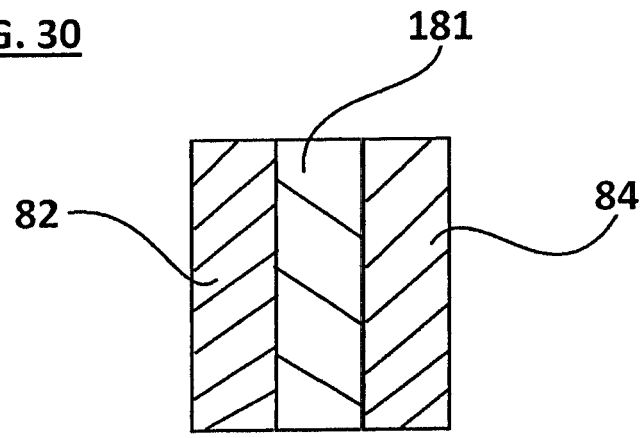
FIG. 30 is a schematic sectional view depicting a spacer member between a rear mounting bracket of a fuselage body and a rear mounting bracket of an aerodynamic housing.

FIG. 30 is a schematic sectional view that depicts a spacer member 181 between a rear mounting bracket 82 of a fuselage body and a rear mounting bracket 84 of an aerodynamic housing.

As mentioned above, the present relates to a design of a jet trainer fuselage to enable the installation of a wholly separate in-line engine and nacelle. A further embodiment will now be described with reference to FIGS. 21-28.

This invention relates to the design of jet trainer aircraft fuselage structure to allow for a modular engine unit of a wide variety of sizes to be installed without a need to redesign the fuselage or wing. The aft section of conventional trainer aircraft fuselage structure is typically designed to encircle and extend along the length of a specific type and size of jet engine, whilst the mid-section of the fuselage is designed to accept tubular air intake ducts that must pass from outside the fuselage through the fuselage walls and onto the front face of the engine to channel air into the engine. The advantage of this configuration is that the engine remains in the centre of the aft fuselage and therefore that the engine's 'line of thrust' passes through the centre of gravity of the aircraft, meaning that no turning forces are imposed on the aircraft when the aircraft's pilot alters the thrust setting of the engine. This means however that should the engine be interchanged for a larger or smaller engine (for example to improve aircraft performance) this requires the surrounding fuselage to be re-designed to accommodate the new engine and air intakes. This requires significant new design and engineering effort over and above that required to design the original fuselage.

To overcome these problems, the present invention proposes that the lower half of the forward fuselage tapers to form a vertical 'wedge' behind the aircraft cockpit. The top surface of the wedge attaches to the underside of the aircraft's mid-mounted wing. The aircraft's mid fuselage section sits on top of the wing, its forward face attached to the upper half of the forward fuselage, and its rearward face to a half-depth rear fuselage constant-section 'plug' which can be designed to be longer or shorter without the plug's cross-section changing in any way, to provide the length of fuselage needed to provide adequate aircraft stability when its rear face is attached in combination to an aft fuselage section which carries the horizontal and vertical tail-planes. The aircraft engine is attached by discrete attachment points to the underside of the mid fuselage section and is surrounded by a nacelle structure that is structurally fully independent of both the fuselage and wing structure. The nacelle structure's exterior surface wraps around the engine to provide streamlining and react air loads, whilst the nacelle's interior surfaces forward of the engine face provide the outboard surfaces of the air intake duct that channels air into the engine. The engine and nacelle combination is joined to the fuselage via the engine attachment points in such a way that the exterior faces of the vertical wedge of the lower half of the forward fuselage now form the inboard surfaces of the air intake duct for feeding air to the engine.

The forward fuselage wedge is designed as primary aircraft structure such that its integrity is critical to the airworthiness of the aircraft and acts as a structural, tapering 'box' to transfer loads from the forward fuselage rearwards and upwards into the main structure of the wing located above it. The tapering of the wedge is such that the shape of its exterior walls, acting as the inboard walls of the air intake duct can be modified through the addition of layers of shaped material which alter the airflow such that the airflow is optimised for a particular engine type.

The engine nacelle is designed as secondary aircraft structure such that its integrity is not critical to the airworthiness of the aircraft. Its exterior surface is shaped specifically to accommodate the engine type that it accommodates. Its interior surfaces forward of the engine face, acting as the outboard walls of the air intake to the engine, are shaped specifically to optimise the airflow into the engine for which the nacelle is designed. Once the engines interchanged for another engine type, the nacelle's interior surfaces forward of the engine face are re-shaped to ensure airflow into the new engine type is optimised. The whole nacelle structure is designed to be fully independent of the aircraft's fuselage and wing structure, meaning that any change of engine type and subsequent impact to the design of the nacelle does not impact the design of the fuselage or wing structure.

Figure 21:
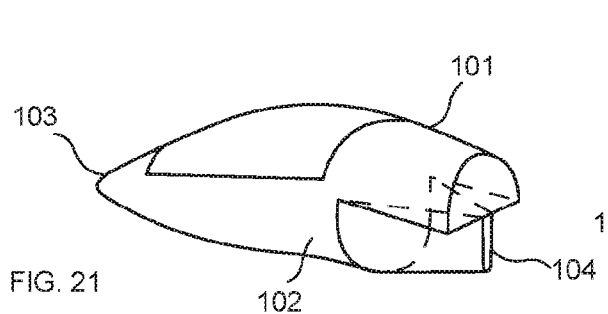
FIG. 21 shows the tapering of the forward fuselage to form a structural 'wedge' behind the cockpit.

In FIG. 21, the aft section 101 of the lower half 102 of the forward fuselage 103 is shown to taper into a vertical wedge 104.

Figure 22:
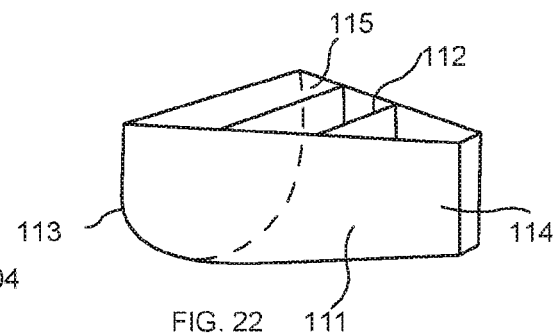
FIG. 22 shows details of the forward fuselage 'wedge'.

In FIG. 22, the wedge is made up of structural skin 111 and internal structure 112 such that the wedge can transfer loads from the forward fuselage into the structural elements of the wing. The forward face 113 of the wedge mirrors the cross-section of the lower half of the forward fuselage, whereas the rearward face 114 is the minimum width necessary to maintain structural strength of the wedge 'box' whilst also tapering as far as possible to a point. Internal members 115 within the wedge 'box' provide the required stiffness and strength of the box.

Figure 23:
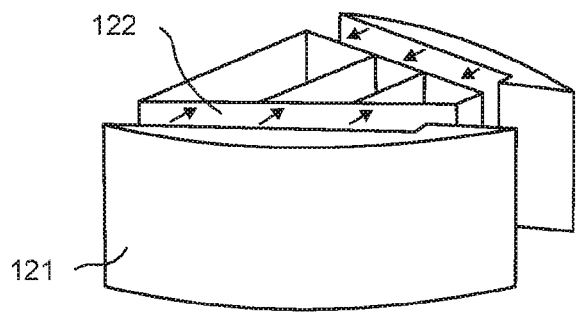
FIG. 23 shows the addition of shaped layers to alter the curvature of the exterior walls of the forward fuselage 'wedge'.

In FIG. 23, shaped layers 121 are attached by a variety of means including bonding or fastening, to the exterior walls 122 of the front fuselage 'wedge'. The shaped layers once attached to the wedge alter the aerodynamic profile of the exterior walls of the wedge such that the airflow passing over these walls towards the engine is improved to the extent required to achieve the desired performance of the engine. The shaped layers extend from the front of the wedge 'box' to a point aft of the wedge 'box' so as to allow the exterior surfaces of the combination of the wedge 'box' and shaped layers to come to a point in front of the engine face, thus allowing airflow passing over both exterior faces of the wedge to meet in front of the engine face with minimal disturbance.

Figure 24:
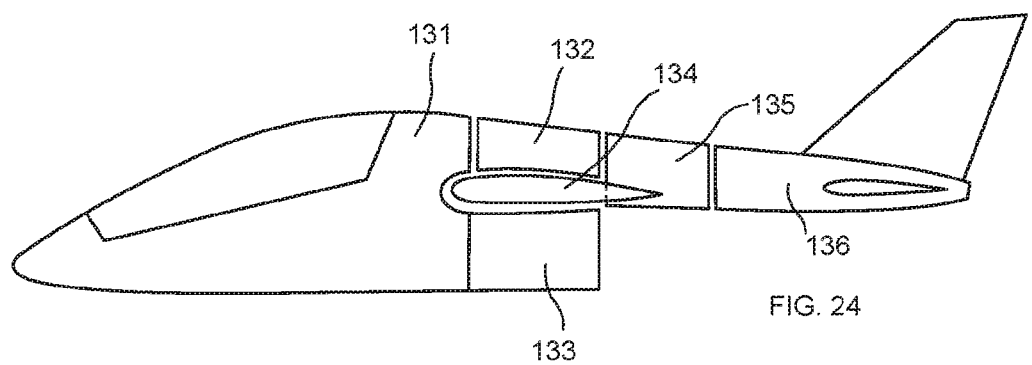
FIG. 24 shows the relationship between the forward fuselage, mid fuselage, wing, aft fuselage plug and rear fuselage.

FIG. 24 shows how the full depth 131 of the forward fuselage transforms into the half-depth of the mid fuselage 132 in combination with the forward fuselage wedge 133 and the wing 134. From this point the mid fuselage 132 continues into the aft fuselage plug 135 and thence to the aft fuselage section 136.

Figure 25:
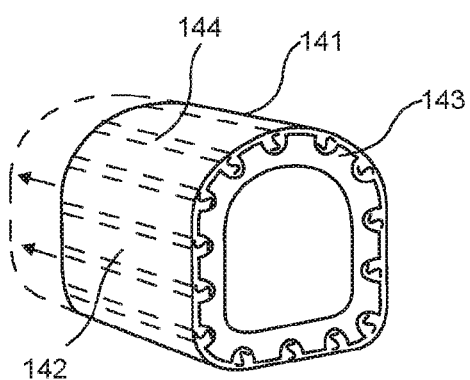
FIG. 25 shows how the aft fuselage plug can be extended or shortened without a change to the cross-section of this portion of the fuselage.

FIG. 25 shows the constant-section aft fuselage plug 141 which can be designed to be shorter or longer simply by extending the skin 142, the number of frames 143 and the length of reinforcing stringers 144, so as to change the overall length of the aft fuselage in order to provide more or less stabilising forces to react changes in the aircraft's centre of gravity incurred by the use of different engine and wing combinations.

Figure 26:
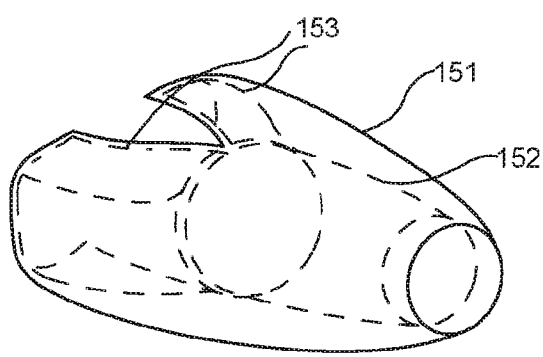
FIG. 26 shows the independent engine nacelle.

FIG. 26 shows the wholly separate nacelle 151 which encloses the engine 152 and the outer walls of air intake ducts 153.

Figure 27:
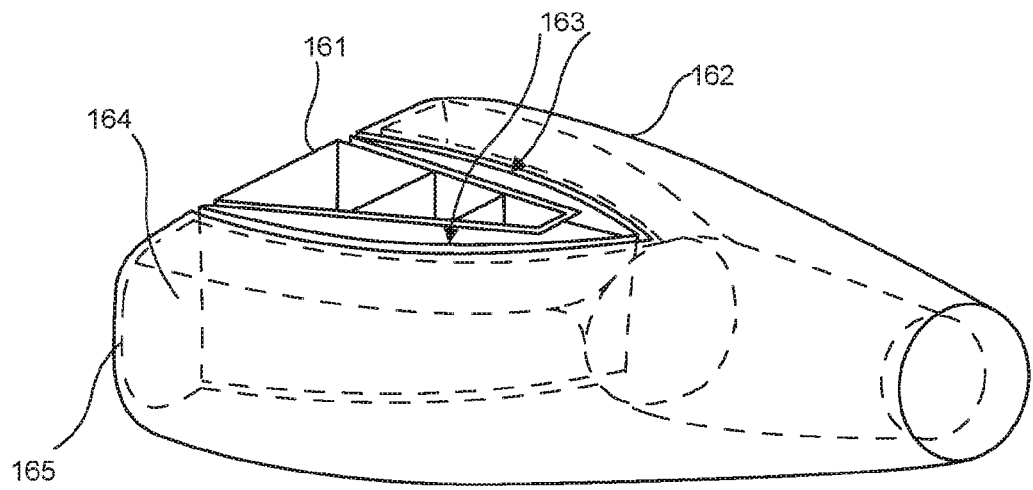
FIG. 27 shows the combination of forward fuselage wedge and engine nacelle.

FIG. 27 shows the arrangement of forward fuselage 'wedge' 161 and engine nacelle 162 such that the exterior walls 163 of the wedge form the inboard surfaces of the air intake duct 164 and the interior walls 165 of the nacelle form the outboard surfaces of the air intake duct.

Figure 28:
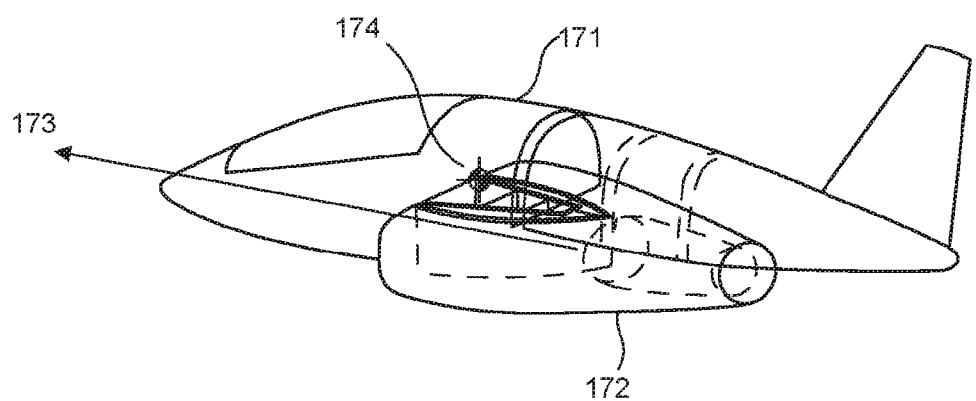
FIG. 28 shows the combination of whole fuselage and installed engine nacelle.

FIG. 28 shows the combination of the whole fuselage 171 and engine nacelle 172 to demonstrate that the thrust-line 173 of the engine remains approximately 'in-line' with the centre of gravity 174 of the aircraft whilst the nacelle does not impinge on the structure of the aircraft.

The present invention relates to a structural assembly that transfers structural loads from the lower section of the aircraft's forward fuselage into the upper section of the aircraft's rear fuselage so as to permit the installation of a discrete propulsion unit immediately aft of the lower section of the aircraft's forward fuselage.

The structural assembly may comprise a wedge that provides the inboard surfaces of an air intake duct for channelling air to the face of an engine or engine(s) mounted aft of the wedge.

The length of the aft fuselage may be modified through a constant-section fuselage section.

The tapering of the exterior surfaces of the wedge may be modified by the addition of a shaped layer or layers.

The complementary surfaces required to form the remainder of an air intake duct to the engine may be provided by a separate engine nacelle structure.

The separate engine nacelle required to accommodate the aircraft's engine(s) may not impinge upon the aircraft's primary structure.

An engine placed aft of the lower section of the forward fuselage may be attached via discrete attachment points to the aircraft's fuselage.

Overall, the present invention may relate to a jet trainer's lower fuselage structure that as a tapering box connects the aircraft's forward fuselage to the aircraft's wing structural box whilst also providing the inboard walls of an air intake duct completed by the interior surfaces of a wholly separate engine nacelle structure.

The invention claimed is:

1. An aircraft comprising:
a fuselage body having a centre-line, the fuselage body extending longitudinally from a nose end to a tail end and the fuselage body comprising a primary support structure for transferring forces along a longitudinal extent of the aircraft;
a single propulsion system comprising at least one engine; and
mounting means comprising mounting brackets to removably suspend the propulsion system externally from the fuselage body,
wherein the propulsion system comprises an aerodynamic housing, and in which the propulsion system is suspendable from the fuselage in order to mount the aerodynamic housing from the fuselage body and, in which, the propulsion system is mounted external of the fuselage body and along the centre-line of the fuselage body, and
in which the mounting brackets are provided on one of the at least one engine located within the aerodynamic housing, and
wherein the propulsion system is secured to the fuselage body directly by the at least one engine and the aerodynamic housing is not directly secured to the fuselage body.

2. An aircraft according to claim 1 in which the aircraft comprises a central wing structure to removably secure lateral outer wing assemblies thereto.

3. An aircraft according to claim 1 in which the aerodynamic housing comprises a secondary structure.

4. An aircraft according to claim 1 in which the propulsion system comprises two lateral air inlets, wherein each lateral air inlet is defined by the aerodynamic housing.

5. An aircraft according to claim 1 in which the aerodynamic housing comprises a front portion which is arranged to locate behind a front part of the fuselage body and wherein the front part of the fuselage body is arranged to shield the front portion of the aerodynamic housing.

6. An aircraft according to claim 5 in which the front portion of the aerodynamic housing comprises a periphery which is sealed against the fuselage body.

7. An aircraft according to claim 6 in which the front portion engages with and abuts an external outer surface of the fuselage body.

8. An aircraft according to claim 6 in which the front portion of the aerodynamic housing comprises a continuous sealing perimeter.

9. An aircraft according to claim 8 in which the sealing perimeter comprises a sealing member which comprises a resilient sealing strip.

10. An aircraft according to claim 1 in which the fuselage comprises an outer skin which encloses the support structure and these form the primary support structure of the aircraft and the propulsion system is located on the external side of the outer skin of the fuselage such that the propulsion system is not a part of or contained within the primary structure.

11. An aircraft according to claim 1 in which the aerodynamic housing is arranged to be suspended aft or behind a front portion of the fuselage body, and the aerodynamic housing is arranged to be suspended below a mid portion of the fuselage body and the aerodynamic housing is arranged to be suspended from a location in front of a rear portion of the fuselage housing body.

12. An aircraft according to claim 1 in which a part of the aerodynamic housing seals against an outer surface of the fuselage body and creates a flush intersection between the respective outer surfaces.

13. An aircraft according to claim 1 in which a part of the aerodynamic housing seals against an outer surface of the fuselage body and creates a contiguous aerodynamic outer surface extending from the fuselage body to the aerodynamic housing.

14. An aircraft according to claim 1 in which the aerodynamic housing defines a first air inlet and a second air inlet for the propulsion system and the first air inlet and the second air inlet converge to create a bifurcated air inlet for the propulsion system.

15. An aircraft according to claim 1 in which the mounting means comprises a first mounting assembly and a second mounting assembly.

16. An aircraft according to claim 15 in which only two mounting assemblies are provided to solely support the propulsion system from the fuselage body, wherein one mounting assembly supports the full weight of the engine and the other mounting assembly provides bracing against lateral movement of the engine.

17. An aircraft according to claim 15 in which the first mounting assembly comprises a front mounting assembly, and the second mounting assembly comprises a rear mounting assembly and in which the front and rear mounting assemblies are located along the centreline of the aircraft and in which the front mounting assembly is longitudinally spaced from the rear mounting assembly along the centreline of the aircraft.

18. An aircraft according to claim 17 in which the rear mounting assembly comprises a spacer member to secure between a rear mounting bracket of the fuselage body and a rear mounting bracket of the aerodynamic housing.

19. An aircraft according to claim 18 in which the spacer member has a longitudinal length to determine a spacing distance between the fuselage body and a rear portion of the propulsion system.

20. An aircraft according to claim 18 in which the spacer member has an upper mounting bracket for securing to the rear mounting bracket of the fuselage body and the spacer member has two lower mounting brackets for securing to two rear mounting brackets of the propulsion system.

21. An aircraft according to claim 1, in which the aerodynamic housing is solely supported by the engine.

22. An aircraft training assembly kit comprising an aircraft comprising:
a fuselage body having a centre-line, the fuselage body extending longitudinally from a nose end to a tail end and the fuselage body comprising a primary support structure for transferring forces along a longitudinal extent of the aircraft;
a first single propulsion system comprising at least one engine;
a second single propulsion system comprising at least one engine;
mounting means comprising mounting brackets to removably suspend the first single propulsion system or the second single propulsion system externally from the fuselage body; and
wherein the first single propulsion system comprises a first aerodynamic housing, and in which the first single propulsion system is suspendable from the fuselage in order to mount the first aerodynamic housing from the fuselage body, with the first single propulsion system mounted external of the fuselage body and along the centre-line of the fuselage body, and
wherein the second single propulsion system comprises a second aerodynamic housing, and in which the second single propulsion system is suspendable from the fuselage in order to mount the second aerodynamic housing from the fuselage body with the second single propulsion system mounted external of the fuselage body and along the centre-line of the fuselage body, and
in which the mounting brackets are provided on one of the at least one engine located within the first aerodynamic housing or the at least one engine located within the second aerodynamic housing, and
wherein the first propulsion system is configured to be secured to the fuselage body directly by at least one engine with the first aerodynamic housing not directly secured to the fuselage body, and
wherein the second propulsion system is configured to be secured to the fuselage body directly by at least one engine with the second aerodynamic housing not directly secured to the fuselage body.

23. An aircraft training assembly kit according to claim 22 in which the aircraft training assembly comprises a plurality of mounting means to selectively mount either of the first single propulsion system and the second single propulsion system individually to the fuselage body.

24. An aircraft training assembly kit according to claim 22 in which the aircraft training assembly comprises a central wing structure to removably secure lateral outer wing assemblies thereto and a plurality of lateral outer wing assemblies.

25. A method of reconfiguring an aircraft, the aircraft comprising:
a fuselage body having a centre-line, the fuselage body extending longitudinally from a nose end to a tail end and the fuselage body comprising a primary support structure for transferring forces along a longitudinal extent of the aircraft;
a first single propulsion system comprising at least one engine;
mounting means comprising mounting brackets to removably suspend the first single propulsion system externally from the fuselage body;
wherein the first single propulsion system comprises a first aerodynamic housing, and in which the first propulsion system is suspendable from the fuselage in order to mount the first aerodynamic housing from the fuselage body and, in which, the first propulsion system external of the fuselage body and along the centre-line of the fuselage body;
in which the mounting brackets are provided on one of the at least one engine located within the first aerodynamic housing, and wherein the first propulsion system is configured to be secured to the fuselage body directly by at least one engine with the first aerodynamic housing not directly secured to the fuselage body, and the method comprising removing the first single propulsion system from the fuselage body and suspending a second single propulsion system from the fuselage body.

26. A method of reconfiguring an aircraft according to claim 25 comprising removing a first pair of lateral wing assemblies from a central wing structure and securing a second pair of lateral wing assemblies to the central wing structure.

\* \* \* \* \*